US011133985B2

(12) United States Patent
Schallich et al.

(10) Patent No.: US 11,133,985 B2
(45) Date of Patent: *Sep. 28, 2021

(54) SYSTEMS AND METHODS FOR INTUITIVE HOME NETWORKING

(71) Applicant: A9.COM, Inc., Seattle, WA (US)

(72) Inventors: Timothy A. Schallich, San Francisco, CA (US); Nicholas S. Weaver, San Francisco, CA (US); Nathaniel C. Hardison, San Francisco, CA (US)

(73) Assignee: A9.COM, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/028,835

(22) Filed: Sep. 22, 2020

(65) Prior Publication Data

US 2021/0006461 A1 Jan. 7, 2021

Related U.S. Application Data

(63) Continuation of application No. 16/116,787, filed on Aug. 29, 2018, now Pat. No. 10,833,927, which is a (Continued)

(51) Int. Cl.
*H04L 12/24* (2006.01)
*H04L 29/06* (2006.01)
(Continued)

(52) U.S. Cl.
CPC ...... *H04L 41/0806* (2013.01); *H04L 12/2898* (2013.01); *H04L 12/6418* (2013.01); *H04L 41/08* (2013.01); *H04L 41/24* (2013.01); *H04L 63/08* (2013.01); *H04L 65/1069* (2013.01); *H04L 12/2803* (2013.01); *H04L 12/2807* (2013.01); *H04L 67/26* (2013.01)

(58) Field of Classification Search
CPC .... H04L 41/08; H04L 41/0803; H04W 84/12; H04W 88/08; H04W 8/005
See application file for complete search history.

(56) References Cited

U.S. PATENT DOCUMENTS 6,012,088 A 1/2000 Li et al.
6,195,705 B1 2/2001 Leung
(Continued)

*Primary Examiner* — Jeong S Park
(74) *Attorney, Agent, or Firm* — Lowenstein Sandler LLP

(57) ABSTRACT

A first router establishes an internet connection between a remote router management platform (RRMP) and the first router via a second router, the second router being part of a local area network. A router identifier of the first router is registered with a user account at the RRMP, the user account being associated with router configuration data for the local area network. The first router sends a request with the router identifier to the RRMP using the internet connection, a request for the router configuration data and receives the router configuration data from the RRMP via the internet connection responsive to the remote router management platform verifying that the first router is registered to the user account. At least a portion of the router configuration data, when executed by the first router, causes the first router to implement the local area network in tandem with the second router.

20 Claims, 9 Drawing Sheets

Related U.S. Application Data continuation of application No. 15/844,431, filed on Dec. 15, 2017, now Pat. No. 10,594,552, which is a continuation of application No. 15/008,251, filed on Jan. 27, 2016, now Pat. No. 9,882,774.

(60) Provisional application No. 62/110,990, filed on Feb. 2, 2015.

(51) Int. Cl.
    *H04L 12/28* (2006.01)
    *H04L 12/64* (2006.01)
    *H04L 29/08* (2006.01)

(56) References Cited

U.S. PATENT DOCUMENTS

| | | | |
|---|---|---|---|
| 7,356,032 | B1 | 4/2008 | Sumorok |
| 7,415,535 | B1 * | 8/2008 | Kuik .................. H04L 61/6004 370/217 |
| 7,421,266 | B1 | 9/2008 | Bruestle et al. |
| 7,441,043 | B1 | 10/2008 | Henry et al. |
| 7,546,357 | B2 | 6/2009 | Manchester et al. |
| 7,627,496 | B2 | 12/2009 | Walker et al. |
| 7,831,250 | B2 | 11/2010 | Johnston, Jr. |
| 7,895,360 | B2 | 2/2011 | Lockridge et al. |
| 7,940,791 | B2 | 5/2011 | Farricker et al. |
| 8,014,354 | B2 | 9/2011 | Eichenberger et al. |
| 8,041,785 | B2 | 10/2011 | Mazur et al. |
| 8,077,632 | B2 | 12/2011 | Samuels et al. |
| 8,117,290 | B2 | 2/2012 | Hamilton et al. |
| 8,134,942 | B2 | 3/2012 | Messinger et al. |
| 8,180,835 | B1 | 5/2012 | Lu et al. |
| 8,270,310 | B2 | 9/2012 | Raleigh |
| 8,275,900 | B2 | 9/2012 | Meenan et al. |
| 8,478,849 | B2 | 7/2013 | Marl et al. |
| 8,520,651 | B2 | 8/2013 | Yamada et al. |
| 8,533,309 | B1 | 9/2013 | Howarth et al. |
| 8,631,100 | B2 | 1/2014 | Gandhewar et al. |
| 8,729,731 | B2 | 5/2014 | Roepke et al. |
| 8,751,614 | B2 | 6/2014 | Haddad et al. |
| 8,867,407 | B2 | 10/2014 | Chang |
| 8,908,698 | B2 | 12/2014 | Aguayo et al. |
| 8,909,196 | B2 | 12/2014 | Chang et al. |
| 8,955,088 | B2 | 2/2015 | Soliman et al. |
| 8,971,209 | B2 | 3/2015 | Magnuson et al. |
| 9,015,855 | B2 | 4/2015 | Waisman-Diamond et al. |
| 9,058,416 | B2 | 6/2015 | Angeles |
| 9,219,617 | B2 | 12/2015 | Newton |
| 9,226,119 | B2 | 12/2015 | Suryavanshi et al. |
| 9,286,047 | B1 | 3/2016 | Avramov et al. |
| 9,319,309 | B2 | 4/2016 | Mitomi et al. |
| 9,374,267 | B2 | 6/2016 | Poirier et al. |
| 9,467,459 | B2 | 10/2016 | Chandrasekaran et al. |
| 9,473,478 | B2 | 10/2016 | Subramanian et al. |
| 9,648,548 | B1 * | 5/2017 | Gan ........................ H04L 67/12 |
| 9,800,430 | B2 | 10/2017 | Ha |
| 9,882,774 | B2 * | 1/2018 | Schallich ............ H04L 12/2898 |
| 10,594,552 | B2 * | 3/2020 | Schallich ............ H04L 12/2898 |
| 10,833,927 | B2 * | 11/2020 | Schallich ............ H04L 63/08 |
| 2002/0128925 | A1 | 9/2002 | Angeles |
| 2003/0108017 | A1 * | 6/2003 | Famolari ................. H04L 29/06 370/338 |
| 2003/0110240 | A1 | 6/2003 | Lockridge et al. |
| 2003/0115460 | A1 | 6/2003 | Arai |
| 2004/0203748 | A1 | 10/2004 | Kappes et al. |
| 2005/0149204 | A1 | 7/2005 | Manchester et al. |
| 2006/0159029 | A1 | 7/2006 | Samuels et al. |
| 2006/0247824 | A1 | 11/2006 | Walker et al. |
| 2006/0285510 | A1 | 12/2006 | Kim et al. |
| 2007/0022185 | A1 | 1/2007 | Hamilton et al. |
| 2007/0274285 | A1 | 11/2007 | Werber et al. |
| 2007/0274314 | A1 | 11/2007 | Werber et al. |
| 2008/0019367 | A1 | 1/2008 | Ito et al. |
| 2008/0062977 | A1 | 3/2008 | Kaneko et al. |
| 2008/0075090 | A1 | 3/2008 | Farricker et al. |
| 2008/0172477 | A1 | 7/2008 | Mazur et al. |
| 2009/0119770 | A1 | 5/2009 | Soliman et al. |
| 2009/0141691 | A1 * | 6/2009 | Jain ........................ H04W 88/10 370/338 |
| 2010/0008272 | A1 | 1/2010 | Messinger et al. |
| 2010/0074225 | A1 | 3/2010 | Johnston, Jr. |
| 2010/0097982 | A1 | 4/2010 | Eichenberger et al. |
| 2010/0188975 | A1 | 7/2010 | Raleigh |
| 2010/0238862 | A1 | 9/2010 | Davidson et al. |
| 2010/0257584 | A1 | 10/2010 | Meenan et al. |
| 2010/0313232 | A1 | 12/2010 | Norin |
| 2011/0007159 | A1 | 1/2011 | Camp et al. |
| 2011/0101781 | A1 | 5/2011 | Roepke et al. |
| 2011/0122774 | A1 | 5/2011 | Hassan et al. |
| 2011/0134798 | A1 * | 6/2011 | Magnuson .......... H04L 41/0853 370/254 |
| 2011/0292206 | A1 | 12/2011 | Newton |
| 2011/0299518 | A1 | 12/2011 | Chang |
| 2011/0314129 | A1 | 12/2011 | Rezaiifar et al. |
| 2012/0023207 | A1 | 1/2012 | Gandhewar et al. |
| 2012/0052384 | A1 | 3/2012 | Roh et al. |
| 2012/0057456 | A1 | 3/2012 | Bogatin et al. |
| 2012/0134308 | A1 | 5/2012 | Yamada et al. |
| 2012/0290694 | A9 | 11/2012 | Marl et al. |
| 2012/0309371 | A1 | 12/2012 | Yamada |
| 2012/0309408 | A1 | 12/2012 | Marti et al. |
| 2013/0091254 | A1 | 4/2013 | Haddad et al. |
| 2013/0173797 | A1 | 7/2013 | Poirer et al. |
| 2013/0219082 | A1 | 8/2013 | Mitomi et al. |
| 2013/0239181 | A1 | 9/2013 | Varsavsky Waisman-Diamond et al. |
| 2013/0301627 | A1 | 11/2013 | Chen et al. |
| 2014/0010225 | A1 | 1/2014 | Puregger |
| 2014/0064126 | A1 | 3/2014 | Lim et al. |
| 2014/0108149 | A1 * | 4/2014 | Jabara ................... H04W 4/029 705/14.64 |
| 2014/0108627 | A1 | 4/2014 | Donley et al. |
| 2014/0156082 | A1 | 6/2014 | Ha |
| 2014/0162600 | A1 | 6/2014 | Chang et al. |
| 2014/0283029 | A1 | 9/2014 | Chandrasekaran et al. |
| 2014/0334471 | A1 | 11/2014 | Chen |
| 2014/0351392 | A1 | 11/2014 | Baker et al. |
| 2015/0089594 | A1 * | 3/2015 | Subramanian ........ H04W 8/205 726/4 |
| 2015/0141005 | A1 * | 5/2015 | Suryavanshi ......... H04W 48/16 455/434 |
| 2016/0036768 | A1 * | 2/2016 | Pratapa ................. H04W 76/19 709/245 |
| 2016/0050710 | A1 | 2/2016 | Hagan |
| 2016/0165570 | A1 | 6/2016 | Kim et al. |
| 2016/0269277 | A1 * | 9/2016 | Floberg ............... H04L 49/1584 |
| 2016/0380820 | A1 | 12/2016 | Horvitz et al. |

* cited by examiner

SYSTEMS AND METHODS FOR INTUITIVE HOME NETWORKING

RELATED APPLICATIONS

This application is a continuation of U.S. application Ser. No. 16/116,787, filed 29 Aug. 2018, which is a continuation of U.S. application Ser. No. 15/844,431, filed 15 Dec. 2017, which is a continuation of U.S. application Ser. No. 15/008,251, filed 27 Jan. 2016, issued as U.S. Pat. No. 9,882,774, which claims the benefit of U.S. Provisional Application No. 62/110,990, filed on 2 Feb. 2015, all of which are incorporated in their entirety by this reference.

TECHNICAL FIELD

This invention relates generally to the computer networking field, and more specifically to new and useful systems and methods for intuitive home networking.

BACKGROUND

The modern internet has revolutionized communications by enabling computing devices to transmit large amounts of data quickly over incredibly vast differences. The rate of innovation set by application and web developers is breathtakingly fast, but unfortunately, not all aspects of the internet experience have kept pace. In particular, even as people rely more and more heavily on home networking solutions to enable internet connectivity for a rapidly increasing collection of electronic devices, the technology underpinning those solutions often provides a woefully inadequate user experience. Thus, there is a need in the computer networking field to create new and useful systems and methods for intuitive home networking.

DESCRIPTION OF EMBODIMENTS

The following description of the preferred embodiments of the invention is not intended to limit the invention to these preferred embodiments, but rather to enable any person skilled in the art to make and use this invention.

1. System for Intuitive Home Networking

Figure 1:
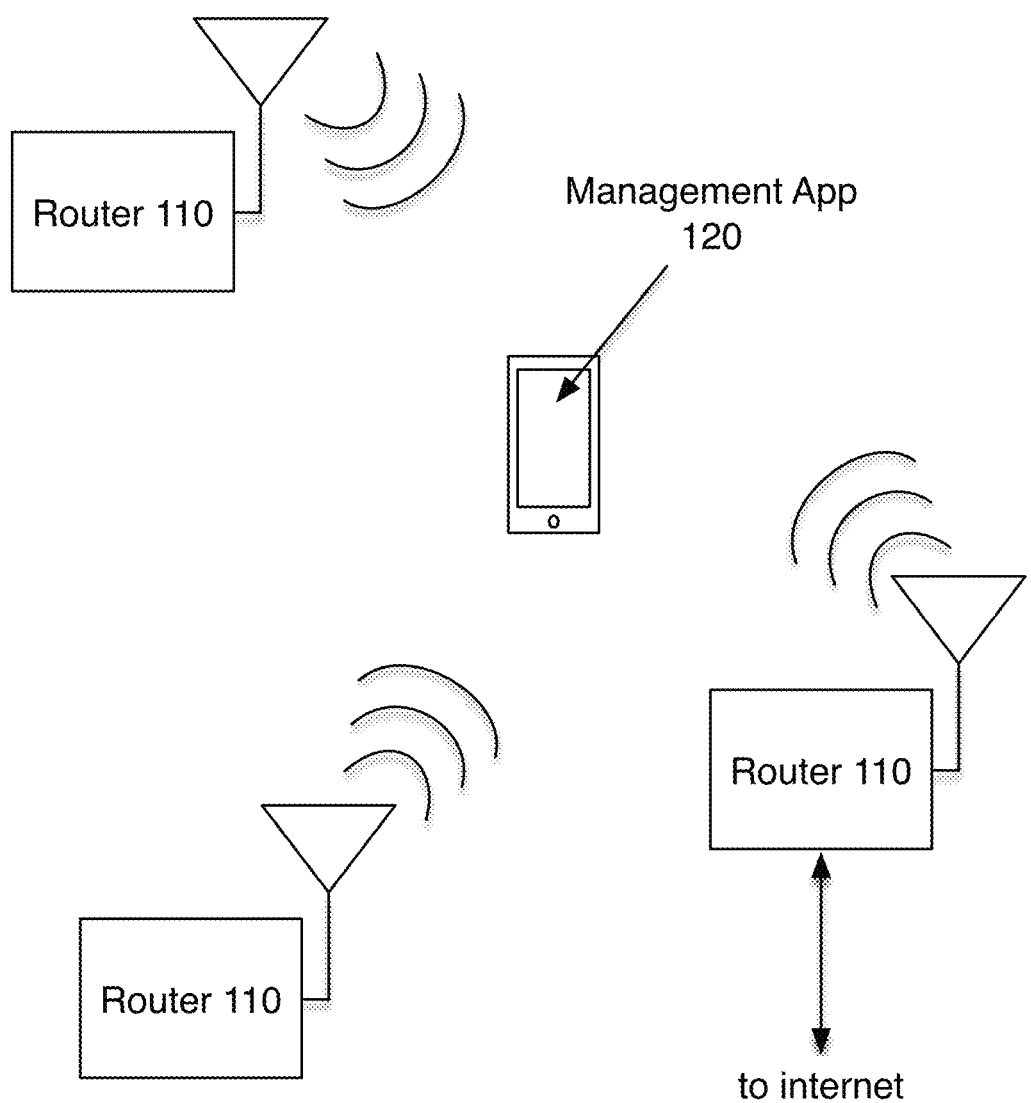
FIG. 1 is a diagram representation of a system of a preferred embodiment.

A system 100 for intuitive home networking includes a router 110 and a management application 120, as shown in FIG. 1. The system may additionally include additional routers 110 which, along with the first router 110, can be configured to create a mesh network. The system 100 functions to provide a home networking solution that is easy and intuitive to access and manage.

Traditional home networking solutions are often based on old and user-unfriendly technologies. The majority of routers are used and configured in much the same way that they were in 2000, when the 802.11b standard was first introduced. The consequence of this is that though router speeds (both wireless and wired) have increased enormously, most home users are no more in control of their home network than they were fifteen years ago. One only needs to look at the proliferation of wireless networks with SSIDs like "ATT032" or "2WIRE231" to see this effect. In an era where the average person can deposit checks, video chat with friends thousands of miles away, watch movies, and shop for virtually anything without leaving their living room, they are unable to alter something as simple as a wireless network name.

There is an obvious inconvenience associated with not being able to change a wireless network SSID, but this issue is only the tip of an iceberg of problems caused by traditional home networking solutions. Many users are just as unable to change passwords associated with their routers, which is not only inconvenient (who wants to remember a password like 'A9DS8F7ADS9'?) but also insecure. More technologically savvy users may be able to access and alter these parameters, but even many power users find home networking management interfaces confusing and cumbersome to use, especially to manage any configuration more complex than a single router interfacing between a single WAN and single LAN.

This simple configuration is often inadequate to support wireless internet connectivity for devices throughout a household, leaving users tethered instead of liberated by wireless connectivity. The system 100 serves to allow users to take charge of their home network by allowing intuitive configuration and use, increasing the security and quality of the home networking experience.

While the system 100 is described throughout this application as being applicable to home networks, a person skilled in the art will recognize that such a system can be applied to any suitable computer network (such as one in a small business). The system 100 is preferably intended for use in scenarios where enterprise networking solutions (and the support staff to maintain them) are not feasible; additionally or alternatively, the system 100 may be used in any suitable scenario.

Figure 2:
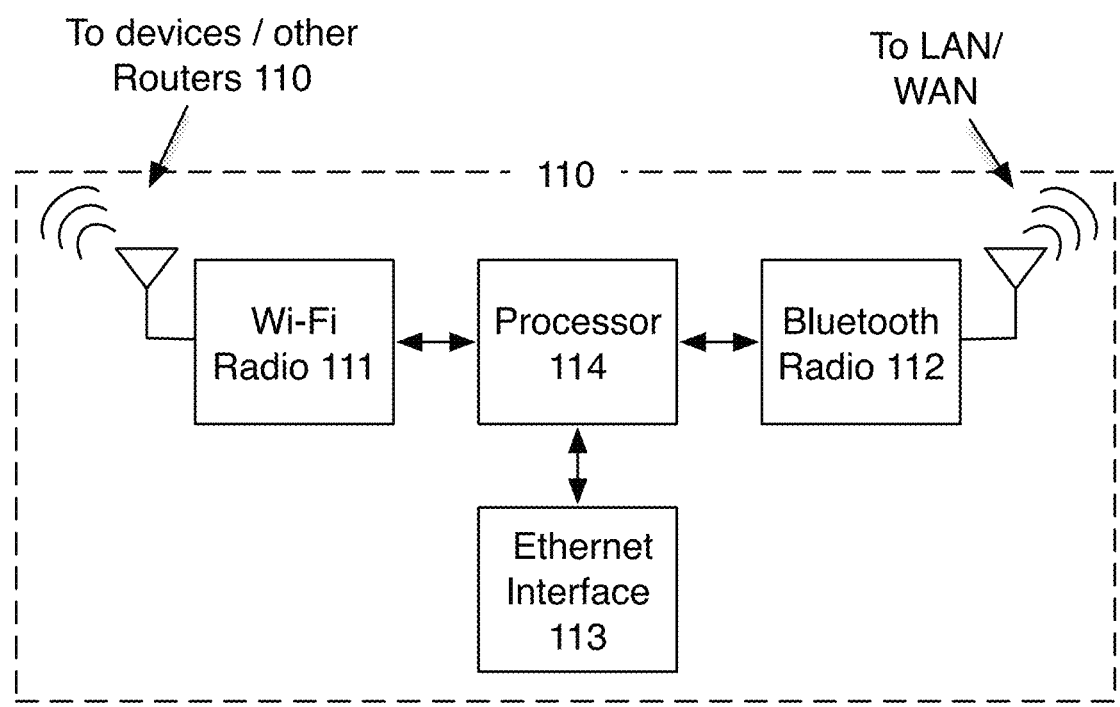
FIG. 2 is a diagram representation of a router of a system of a preferred embodiment.

The router 110, as shown in FIG. 2, serves as a base station for a home network. The router 110 preferably creates a home network (using either or both of wired and wireless network connections) and also serves as the gateway for the home network to the internet (or other WAN). Additionally or alternatively, the router 110 may perform other home networking functions; for example, the router 110 may serve as a wireless access point for an existing network.

Figure 3:
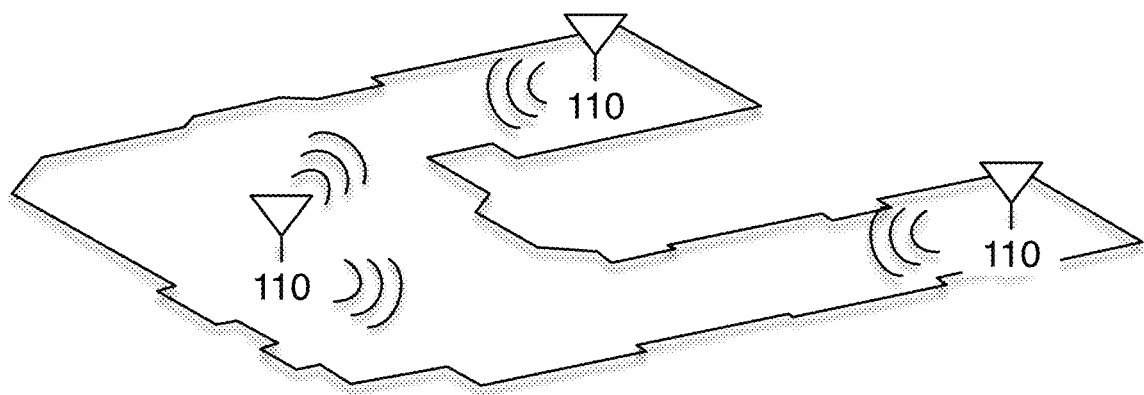
FIG. 3 is a diagram representation of a mesh network using routers of a system of a preferred embodiment.

In one embodiment, the system 100 includes several routers 110 that communicate with each other (either over wired or wireless connections) to create a mesh network, as shown in FIG. 3. Such a mesh network may be especially beneficial for enabling good wireless connectivity throughout a building.

Figure 4:
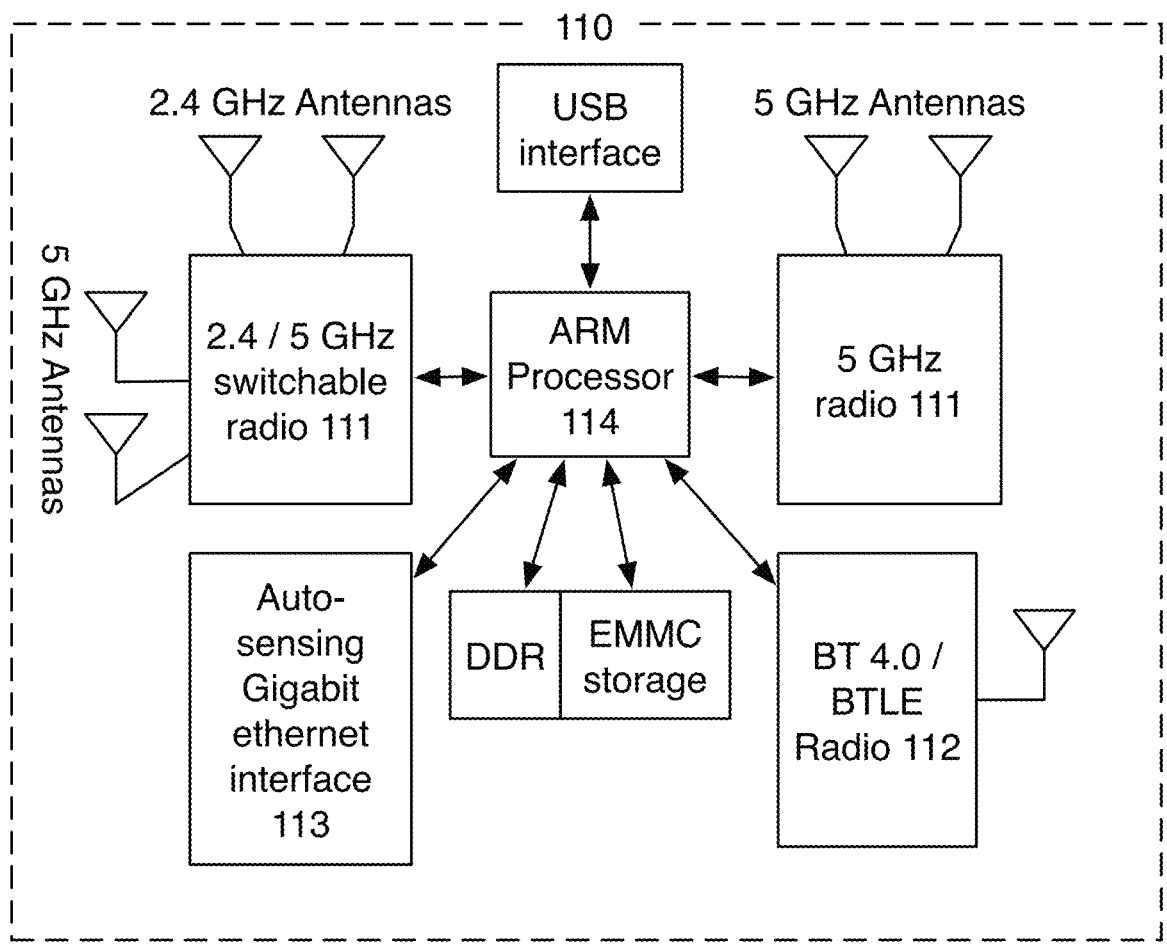
FIG. 4 is a diagram representation of a router of a system of a preferred embodiment.

The router 110 preferably includes a Wi-Fi radio 111, a Bluetooth radio 112, an Ethernet interface 113, and a processor 114. The router 110 may additionally or alternatively include any other hardware or software. In one example implementation, as shown in FIG. 4, a router 110 includes two Wi-Fi radios 111: one 5 GHz radio, and one switchable radio (that may operate at either 5 or 2.4 GHz), a Bluetooth radio 112 capable of both Bluetooth 4.0 and BTLE communication, an auto-sensing gigabit Ethernet interface 113, an ARM processor 114, DDR RAM, EMMC storage (for router firmware), and a USB interface (e.g., for adding network-accessible storage).

The Wi-Fi radio 111 functions to provide wireless access to the router 110. The Wi-Fi radio 111 preferably serves to allow electronic devices (e.g., smartphones, laptops, gaming consoles) to communicate wirelessly with the router 110 and with each other through a LAN. Additionally or alternatively, the Wi-Fi radio 111 may be used to communicate with another router 110, with a wireless WAN, or with any other device or wireless network.

The Wi-Fi radio 111 preferably includes at least one antenna; additionally or alternatively, the Wi-Fi radio 111 may include an interface to connect to an external antenna. Antennas may be of a variety of antenna types; for example, patch antennas (including rectangular and planar inverted F), reflector antennas, wire antennas (including dipole antennas), bow-tie antennas, aperture antennas, loop-inductor antennas, ceramic chip antennas, antenna arrays, and fractal antennas.

Configuration and control of the Wi-Fi radio 111 is preferably performed by the processor 114, but may additionally or alternatively be performed by any suitable controller.

The Wi-Fi radio 111 preferably supports communication over all of IEEE 802.11 a/b/g/n/ac standards, but may additionally or alternatively support communication according to any standard (or no standard at all).

The router 110 may include any number of Wi-Fi radios 111 operating on any suitable frequency ranges. In one implementation, the router 110 includes two Wi-Fi radios 111: one operable on either of the 2.4 GHz band and the 5 GHz band (the radio 111 may switch between the two), and another operable on only the 5 GHz band. This enables the router 110 to select from two different communication modes (2.4 GHz+5 GHz or 5 GHz+5 GHz) in order to maximize connection quality. In this implementation, the router 110 includes six Wi-Fi antennas: 2 for 2.4 GHz and 4 for 5 GHz (two for each Wi-Fi radio 111).

The Wi-Fi radios 111 preferably operate using single-input/single-output (SISO) communication techniques, but may additionally or alternatively operate using multiple-input and/or multiple-output communication techniques (e.g., SIMO, MISO, MIMO). If the Wi-Fi radios 111 operate using MIMO techniques, the Wi-Fi radios 111 may use any type of MIMO techniques (e.g., precoding, spatial multiplexing, space-division multiple access, and/or diversity coding). Further, the Wi-Fi radios 111 may perform MIMO communication either independently (e.g., a radio 111 performs MIMO communication with multiple antennas coupled to that radio) or cooperatively (e.g., two separate radios 111 perform MIMO communication together).

The Bluetooth radio 112 functions to allow devices to communicate with the router 110 over a connection mechanism alternative to Wi-Fi. The Bluetooth radio 112 is preferably used to allow the router 110 to be configured for the first time by a smartphone (or other Bluetooth-enabled computing device). The Bluetooth radio 112 may additionally or alternatively be used for any other purpose; for example, for configuring the router 110 at a different time, for communication between routers 110, or for communication with smart devices in a home (e.g., smart locks, light bulbs).

The Bluetooth radio 112 preferably supports the Bluetooth 4.0 standard, including communications capabilities for classic Bluetooth as well as Bluetooth Low-Energy (BTLE). The Bluetooth radio 112 preferably switches between classic Bluetooth and Bluetooth Low-Energy, but may additionally or alternatively be capable of communicating over both simultaneously.

The Bluetooth radio 112 preferably includes at least one antenna; additionally or alternatively, the Bluetooth radio 112 may include an interface to connect to an external antenna. Antennas may be of a variety of antenna types; for example, patch antennas (including rectangular and planar inverted F), reflector antennas, wire antennas (including dipole antennas), bow-tie antennas, aperture antennas, loop-inductor antennas, ceramic chip antennas, antenna arrays, and fractal antennas.

The Ethernet interface 113 functions to provide wired connectivity to the router 110. The Ethernet interface 113 preferably allows wired devices to connect to the router 110. In many cases, the router 110 may be connected to the internet through the Ethernet interface 113; for example, the Ethernet interface 113 may be used to connect a cable or DSL modem to the router 110.

The Ethernet interface 113 preferably includes a plurality of Ethernet ports. Ports of the Ethernet interface 113 are preferably capable of 1000BASE-T (i.e., gigabit) communication, but may additionally or alternatively be capable of communication at any rate. The Ethernet interface 113 preferably automatically sets the communication rate based on the capabilities of connected devices, but may additionally or alternatively set the communication rate manually.

Ports of the Ethernet interface 113 preferably auto-detect whether a given connection is a WAN connection or a LAN connection. Auto-detecting ports remove a frequent problem in home networking; since users can plug a WAN connection into any port of the Ethernet interface 113, the opportunity for users to mistakenly connect a WAN connection to a LAN designated port (or vice versa) does not exist.

The Ethernet interface 113 preferably performs autodetection by querying the connected device or network, and determining whether the connection is a WAN or LAN connection auto detection response. For example, the Ethernet interface 113 may broadcast an ICMP Address Mask Request; an end node (e.g., a personal computer connected to the router 110) will most likely not respond to this request, while an ISP router (indicative of a WAN connection) may respond to the request. Therefore, if the Ethernet interface 113 receives a response to the ICMP Address Mask Request, it may mark that port as a WAN port; if not, it may mark the port as a LAN port.

The Ethernet interface 113 may additionally or alternatively perform auto detection in any suitable way (e.g., waiting to receive requests over the port and analyzing them, etc.).

In addition to the Ethernet interface 113, the router 110 may additionally or alternatively perform wired communication over any wired interface. For example, the router 110 may perform communication through a powerline interface (e.g., Ethernet over Power).

The processor 114 functions to control the components of the router 110 (e.g., the radios 111 and 112, the Ethernet interface 113, etc.). The processor 114 is preferably an ARM processor, but may additionally or alternatively be any suitable processor or microcontroller.

The processor 114 functions to process data transmitted or received by the router 110; data processed by the processor 114 may originate from either the Wi-Fi radio 111, the Bluetooth radio 112, the Ethernet interface 113, or from any other suitable source. The processor 114 preferably processes data according to instructions in firmware, but may additionally or alternatively process data according to any other suitable instructions.

The processor 114 firmware and/or other router 110 firmware are preferably flash-able over the air (OTA), allowing updates to reach the router 110 without manual or individual configuration.

The processor 114 preferably also performs power management for the router 110. For example, the processor 114 may put components of the router 110 into a sleep mode after a period of inactivity.

The router 110 may additionally or alternatively include any other hardware. For example, the router 110 may include a USB interface (for connection of network-attached storage, a DLNA server, etc. or for configuration purposes). In one embodiment, the router 110 includes a hardware encryption module (HEM). The HEM is preferably a chip that stores an encryption key securely (e.g., the Atmel SHA204) and performs data encryption based on that key, but may additionally or alternatively be any hardware module capable of encrypting transmissions from and/or decrypting transmissions to the router 110.

The router 110 preferably stores firmware and/or software on an embedded MultiMediaCard (eMMC), but may additionally or alternatively store firmware and/or software in any suitable storage solution.

The router 110 preferably operates as a Linux server running Python programs, but may additionally or alternatively operate using any software and/or firmware.

The router 110 is preferably configured using the management application 120 operating on a remote electronic device (e.g., a user's smartphone), but may additionally or alternatively be configured by any suitable manner (e.g., by a web interface).

Parameters of the router 110 that may be user-configured may include any suitable networking (or other parameters); for example, router name, router administrative password, router WAN settings (e.g., connection type, IP address, etc.), router Ethernet settings, router wireless settings (e.g., SSID, password, channel, connection mode), DHCP server settings, port forwarding, NAS settings, and DLNA server settings.

Router 110 software preferably enables the router 110 to automatically configure some configuration parameters; for example, the router 110 may automatically set wireless channels based on other detected wireless networks. As another example, a router 110 may detect another router 110 on a local area network and automatically configure itself as an access point for that LAN.

The management application 120 functions to manage routers 110 that are part of a home network. The management application 120 is preferably a native application running on a smartphone (e.g., an iOS or Android application), but may additionally or alternatively be any suitable application (e.g., a web app, a desktop app, etc.).

Figure 5:
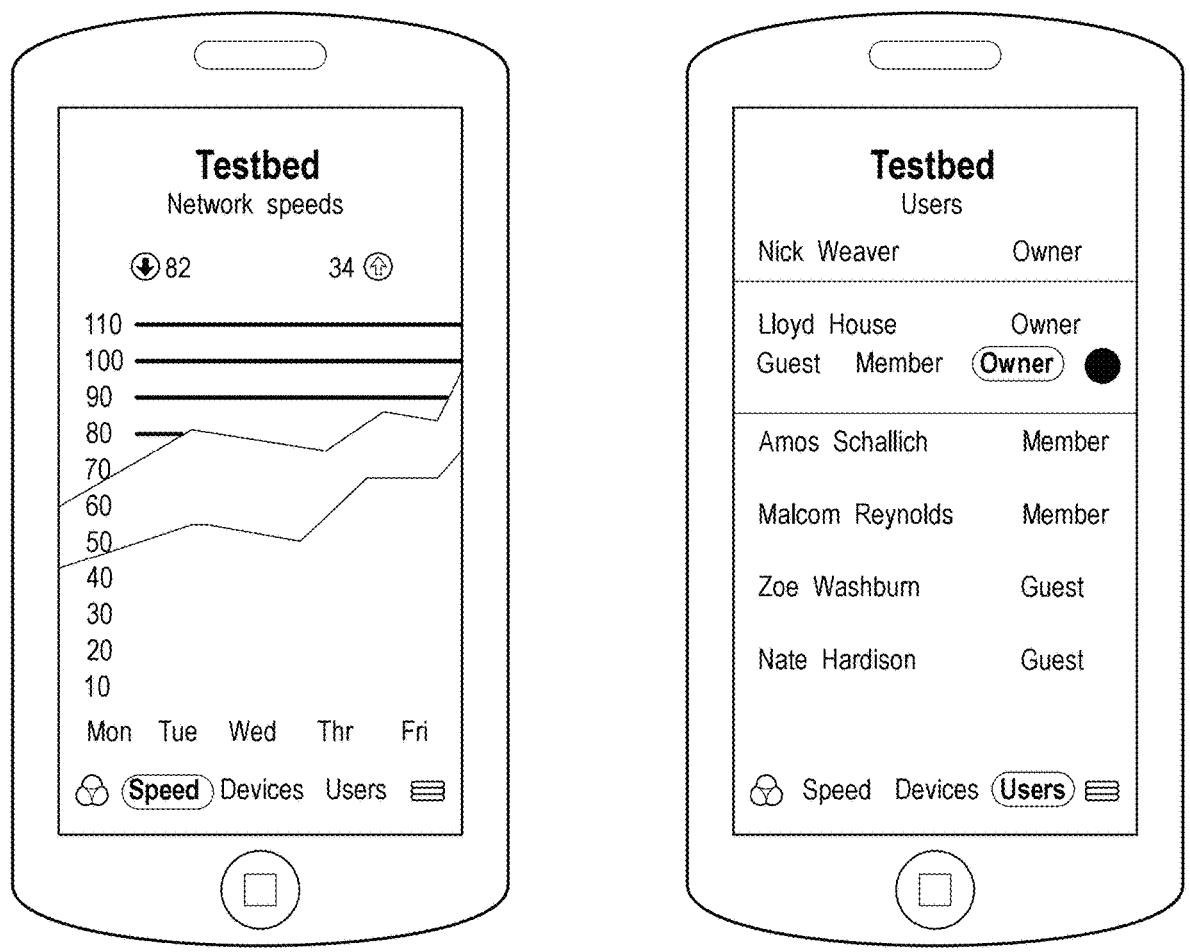
FIG. 5 is an example view of a management application of a system of a preferred embodiment.

The management application 120 preferably aids in first-time configuration of the router 110, as well as management and configuration of the router 110 after initial setup. The management application preferably includes a graphical user interface for monitoring and/or configuration. An example graphical user interface is as shown in FIG. 5.

The management application 120 preferably allows for control of any user-configurable parameters of the router 110, but may additionally or alternatively allow for control of only a subset of user-configurable parameters of the router 110. The management application 120 preferably also allows for network monitoring (e.g., active connections, bandwidth usage, uptime, etc.).

Figure 6A:
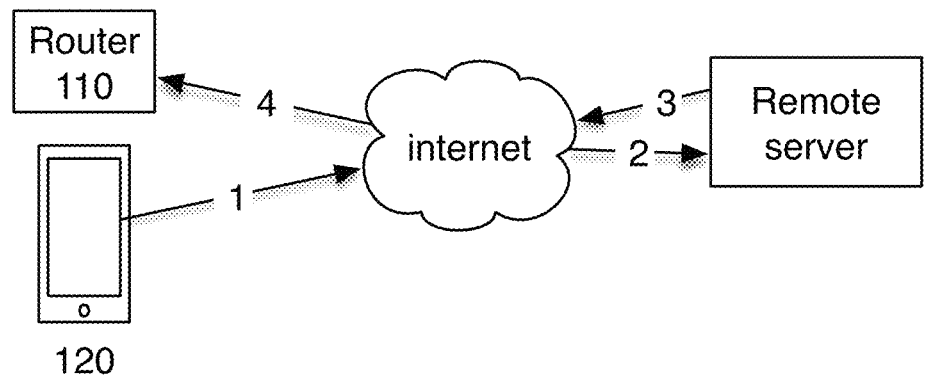
FIGS. 6A and 6B are diagram representations of configuration of a router of a system of a preferred embodiment.

The management application 120 preferably configures the router 110 through an intermediary server (e.g., a remote router management platform), as shown in FIG. 6A. The management application may first send a new configuration through the internet (either through the internet connection of the router 110 or through an alternative connection; e.g., cellphone LTE) to a remote server. Once the configuration is authenticated, it can then be sent back through the internet to the router 110. The remote server preferably stores the configuration file of the router 110 (allowing it to be re-downloaded at any time if necessary).

Figure 6B:
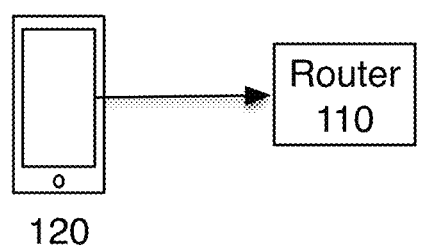

Additionally or alternatively, the management application 120 may configure the router directly (e.g., through Wi-Fi, Bluetooth, USB, etc.), as shown in FIG. 6B.

The router 110 preferably performs initial configuration according to a process designed to reduce complexity while still providing users with a highly satisfactory networking solution.

2. Method for Router Configuration

The traditional process of configuring routers for use in a home network is a nightmare for users. To ease the pain of the process, routers are typically configured for some 'best-guess' scenario: the manufacturer's idea of how a router will be used. Generally, this scenario is that the router will be connected to an internet source via a specific Ethernet port, and the router will serve as the sole gateway, DHCP server, NAT server, and wireless access point for the network.

If the default configuration doesn't work or is not ideal for a particular user, the process for changing router configuration typically involves either opening a utility on a computer connected to the router in question or navigating to the router's gateway IP address in a web browser.

Even if a user is aware that such configuration utilities exist, and the user knows how to access them, there is little guidance for the appropriate settings to implement a desired configuration.

Figure 7:
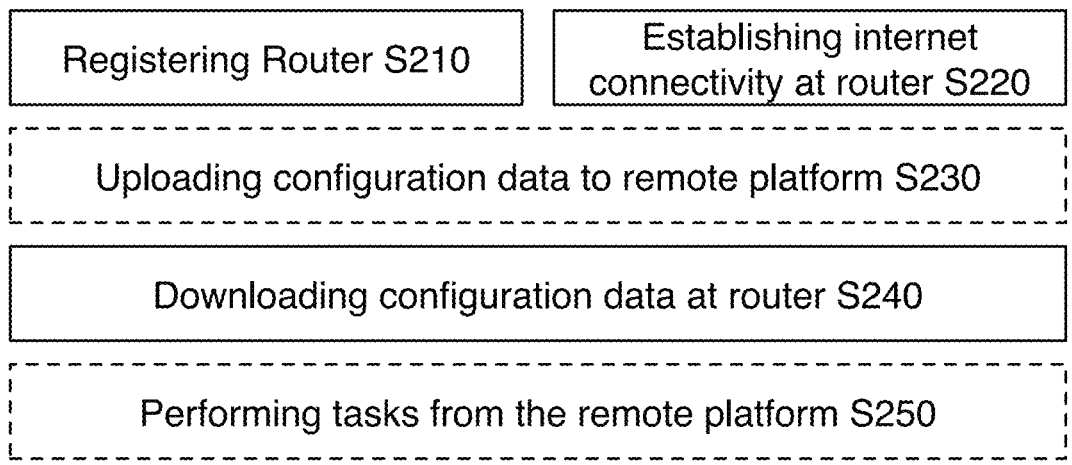
FIG. 7 is a chart representation of a method of a preferred embodiment.
Figure 7:
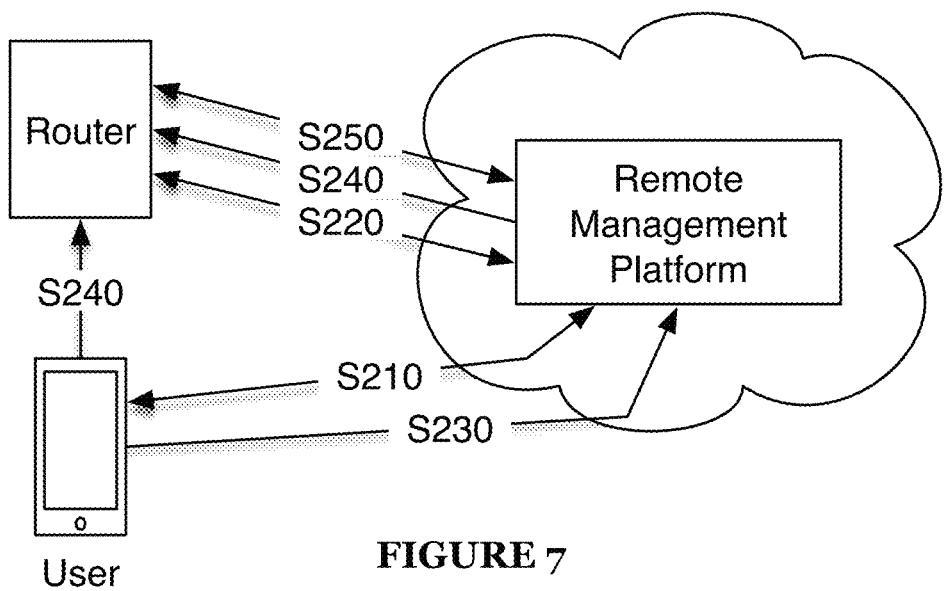

As shown in FIG. 7, a method 200 for performing router configuration includes registering a router S210, establishing internet connectivity at the router S220, and downloading a router configuration S240. The method 200 may additionally or alternatively include uploading configuration data to a remote platform S230 and/or performing tasks received from the remote platform S250.

The method 200 functions to enable routers to be configured automatically or semi-automatically via a connection to a remote server (henceforth referred to as the remote router management platform). This has a number of potential advantages, including:

Automatic configuration
    Based on information collected from a user (or otherwise collected or inferred), routers may be automatically configured based on a unique router identifier and/or a user identifier. This is especially useful for mesh network configuration; a router management platform aware that a user account is linked to several routers may automatically configure them to work in tandem (e.g., one serving as gateway, the others serving as wireless repeaters or as wireless access points).

Further, routers may be automatically reconfigured by the remote router management platform in response to monitored performance characteristics.

Flexible configuration

Since configuration may occur at the remote router management platform, reconfiguration may occur even when a user is not directly connected to a router. While some traditional routers include web access to their configuration panel, this still requires a connection to the router through the internet. Use of the remote router management platform allows users to update configurations even if a user is not able to access the router (and changes to the router can be pushed the next time the router is seen by the remote router management platform). This is especially important for multi-router systems, in which it may be more difficult to access the access points behind the firewall of a primary device.

Enhanced support

Exposing router configuration and performance details to a remote platform means that anyone authorized to access data for a particular router (e.g., a friend, family member, or a professional support team member) may aid in configuring the router. Since the router may connect to the internet through a cellular connection (e.g., via Bluetooth pairing to a user's smartphone), this can be true even if the router's primary internet connection (e.g., cable modem) is down or not properly configured.

Enhanced security

Automatic updates from the cloud mean that routers may be updated with security changes immediately. This is a stark contrast with traditional routers, which are almost never updated at all.

The method 200 is preferably operable on a system for intuitive networking such as the system 100, but may additionally or alternatively be operable on any networking system.

S210 includes registering a router. S210 functions to pair a router identifier with one or more user accounts in the remote router management platform.

Users preferably maintain an account on servers hosted in the cloud and maintained by the router manufacturer; this account is preferably initially used to perform registration (and can later be used to access router configuration options). Router registration data preferably includes an ID number uniquely associated with a particular router (or set of routers).

The user may input router registration data (e.g., router ID) manually into a management application; additionally or alternatively, the management application may directly receive registration data from the router (e.g., over Bluetooth) or the registration data may be sent to the router management platform in any other manner.

Registering the router S210 preferably includes sending registration data to the cloud using a cellular internet connection, but may additionally or alternatively include sending registration data using any suitable internet connection.

Alternatively, registration may be performed automatically by the manufacturer at the time of purchase. For example, when a user purchases a router, the user may be prompted to create or log in to a user account. When the router is shipped (or at any other time), the identifier of that router is automatically linked to the user account specified at the time of purchase.

S220 includes establishing internet connectivity at the router. Establishing internet connectivity at the router S220 functions to allow the router to connect to the router management platform to download configuration data. The router preferably attempts to connect to the internet through either a wired WAN connection (e.g., a connected cable modem) or through an open wireless network.

In one embodiment, S220 includes autodetecting a WAN connection on an Ethernet port (typically one of a set of multiple Ethernet ports). Auto-detecting ports remove a frequent problem in home networking; since users can plug a WAN connection into any port of the Ethernet interface, the opportunity for users to mistakenly connect a WAN connection to a LAN designated port (or vice versa) does not exist.

In this embodiment, S220 preferably includes performing autodetection by querying the connected device or network, and determining whether the connection is a WAN or LAN connection via an auto detection response. For example, the Ethernet interface may broadcast an ICMP Address Mask Request; an end node (e.g., a personal computer connected to the router) will most likely not respond to this request, while an ISP router (indicative of a WAN connection) may respond to the request. Therefore, if the Ethernet interface receives a response to the ICMP Address Mask Request, it may mark that port as a WAN port; if not, it may mark the port as a LAN port.

In one embodiment, configured routers broadcast a restricted open network. The restricted open network is preferably hidden (i.e., it does not broadcast its SSID). Alternatively, the restricted open network may not be hidden. In this embodiment, routers attempting to connect to the internet during configuration may connect to any nearby router's open network. Restricted open networks preferably only allow access to servers used for router configuration/registration (e.g., the router management platform); additionally or alternatively, the restricted open network may allow any other suitable access. For example, the restricted open network may allow communication with Windows update servers in addition to router management platforms. The restricted open network preferably allows connections with any device requesting to join; additionally or alternatively, the restricted open network may only allow devices with certain credentials or characteristics to connect. For example, the restricted open network may only allow devices with a particular MAC address prefix (e.g., the prefix corresponding to the router manufacturer) to connect. Devices connecting to the restricted open network are preferably isolated from other devices (e.g., on the main network associated with the router broadcasting the restricted open network) using a virtual LAN; alternatively, devices connecting to the restricted open network may operate on the same network as devices connecting to a secured wireless network.

S230 includes uploading configuration data to a remote platform. Uploading configuration data to the remote platform S230 functions to transmit configuration information from a platform operating router management software (e.g., a smartphone, a computer) to a remote router management platform (or any other suitable server). Uploading a configuration to the remote platform S230 preferably includes uploading configuration data (linked with a particular router ID and a particular user account) over a cellular internet connection, but may additionally or alternatively include uploading configuration data using any suitable network connection. Configuration parameters may include any suitable networking (or other) parameters; for example, router name, router administrative password, router WAN settings (e.g., connection type, IP address, etc.), router Ethernet settings, router wireless settings (e.g., SSID, password, channel, connection mode), DHCP server settings, port forwarding, NAS settings, and DLNA server settings.

S240 includes downloading configuration data at the router. S240 preferably includes downloading configuration data automatically from the remote platform, but may additionally or alternatively include downloading configuration data from any other source. For example, it may be useful in initial router setup (or at other times) for a user to configure the router over a local network link (e.g., over a direct Bluetooth connection between a user's smartphone and the router).

When the router is connected to the remote management platform, the router preferably sends its addressing information to the platform. For example, the router may send a heartbeat signal to the platform periodically. When a new configuration is to be applied to a router, a server of the platform preferably pushes the new configuration to the router, where it is then applied. Additionally or alternatively, the router may receive and apply configurations in any suitable manner; for example, the router may check the platform periodically for updates (i.e., fetch instead of push).

Performing tasks received from the cloud S250 functions to allow the router to be controlled from the cloud. S250 may include applying configuration changes, for instance, or any other suitable task. For example, Step S250 may include performing a WAN connection task, a LAN connection test, other periodic tests (e.g., a ping or traceroute to a particular destination), firmware updates, or security certificate updates.

If a router is registered to a network containing more than one router (preferably identified during S210), the router may automatically configure as an access point or as a wireless repeater (instead of as an internet gateway). Assignment of the master router is preferably performed automatically (e.g., the first router connected to the internet is the master) but additionally or alternatively may be performed manually (e.g., a particular router ID is set as the master router). The master router preferably runs the network DHCP server and serves as the gateway to the internet. The master server also preferably runs the RADIUS server (or other authentication server) of the network (to enable the network authentication as described below).

3. Method for Network Authentication

As previously described, another problem plaguing traditional networking products is the network authentication process. Home networking products typically set a single password per network, which must be given to anyone wishing to access the network. This not only prevents fine-grained per-user control, but also poses substantial security issues.

Figure 8:
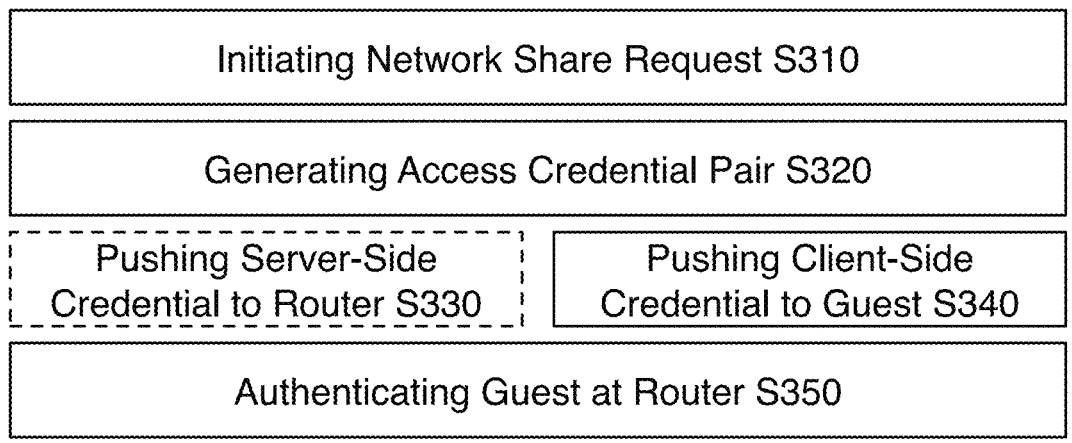
FIG. 8 is a chart representation of a method of a preferred embodiment.
Figure 8:
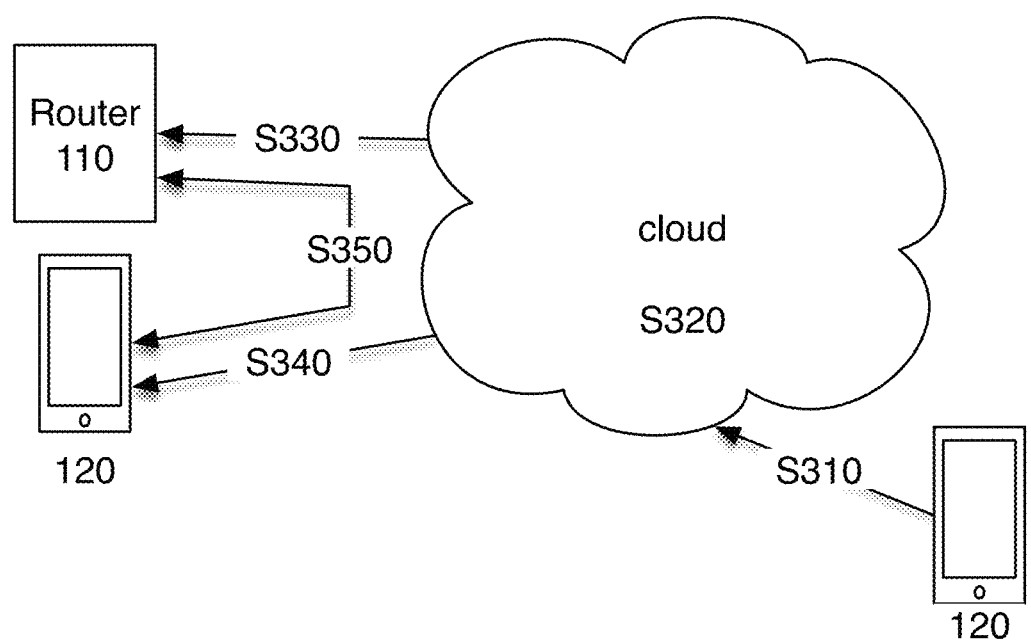
Figure 9:
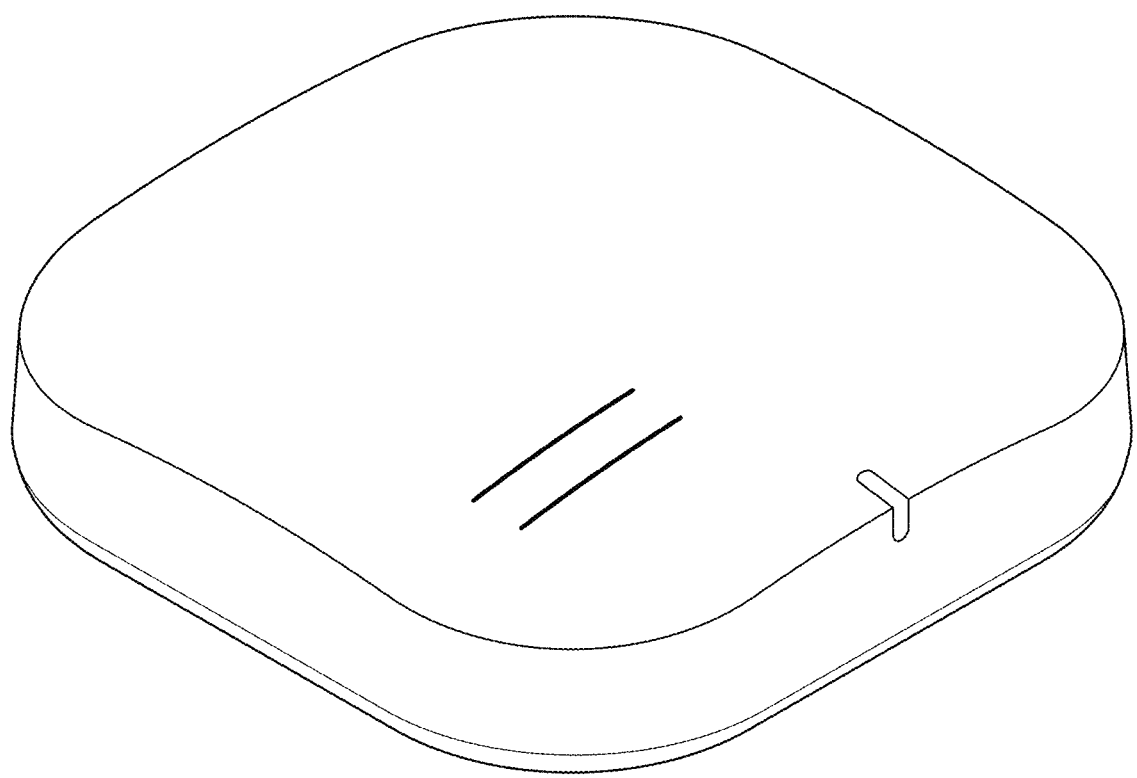
FIG. 9 is an example rendering of a router of a system of a preferred embodiment.

As shown in FIG. 8, a method 300 for network authentication may include initiating a network share request from a host S310, generating an access credential pair S320, pushing the server-side credential to the router S330, pushing the client-side credential to a guest S340, and authenticating the guest at the router S350.

The method 300 preferably performs network configuration according to a certificate-based process that enables higher degrees of user control while not overly complicating user experience. The method 300 preferably allows router owners to issue individual credentials to guests, allowing granular control of access. For example, a user may allow a neighbor to access the user's network, but with bandwidth restrictions or a time limit placed on use. As another example, a user may allow a child to access the network, but only to visit particular whitelisted web sites.

Initiating a network share request from a host S310 functions to allow an authenticated network administrator (e.g., a user owning a particular home network) to initiate a request to share network credentials with a guest. The network share request is preferably initiated from a management application for the router, but may additionally or alternatively be initiated from any suitable source linked with credentials of a router administrator (e.g., network owner or trusted user).

In one embodiment, a network share request is initiated by a host selecting a "share" button within a mobile management app. The host is prompted to enter contact information for the guest (e.g., an email address, a phone number) or to select the guest from a contact list (allowing contact information to be entered automatically). The contact information for the guest is then sent to a remote router management platform along with information identifying the host's network (e.g., host login name, router ID, etc.). Network share requests may additionally or alternatively be generated in any suitable manner; e.g., a password may be texted to a person or device desired to join the network.

Generating an access credential pair S320 functions to create access credentials for both the router of the host's network and the guest's device (e.g., smartphone, laptop, etc.). Generating an access credential pair preferably includes generating two X.509 certificates (one for the router and one for the guest device), but may additionally or alternatively include generating any other access credential pair.

Generating an access credential pair S320 may only be necessary if certificates have not been previously generated for a given guest device and/or a given router. If, for example, a router or a guest device is associated (e.g., within a database in the cloud) with previously generated access credentials, those credentials may potentially be reused.

In a variation of a preferred embodiment, S320 may include only generating a single access credential. For example, S320 may include generating only a client-side credential or only a server-side credential.

Pushing the server-side credential to the router S330 functions to provide the router with access credentials that authenticate the router to the guest device. The server-side credential is preferably automatically pushed to the router (e.g., by sending a command to the router from the cloud to download the certificate); additionally or alternatively, the server-side credential may be fetched by the router as part of periodic maintenance, or the server-side credential may be delivered to the router in any suitable manner.

In home networks with multiple routers connected in a mesh network, the server-side credential is preferably sent to a RADIUS server operating on the home network (which is preferably hosted on only one of the routers).

Pushing the client-side credential to a guest S340 functions to provide the guest device with access credentials that authenticate the guest device to the router. The client-side credential is preferably pushed to the guest by sending an email or text message containing the credential or a link to the credential. Credentials may be installed on the guest device in any suitable manner; for example, certificates may be installed on Apple devices through use of provisioning profiles.

Authenticating the guest at the router S350 functions to allow the guest device access to the router's network. Authenticating preferably includes authenticating according to Extensible Authentication Protocol Transport Layer Security (EAP-TLS), but may additionally or alternatively include authenticating the guest at the router using any suitable authentication method.

Guest authentication may be linked to certain configuration settings. For example, a guest authentication may initiate bandwidth limiting on guest access, time limits, website blacklisting/whitelisting, and/or any other suitable parameters.

Guest authentication may be linked with any other suitable system, for example, guest authentication for a set amount of time may be given in response to receipt of payment.

The router preferably is Hotspot 2.0-enabled; any guest devices with Hotspot 2.0 capability preferably automatically join networks for which they have appropriate credentials.

The methods of the preferred embodiment and variations thereof can be embodied and/or implemented at least in part as a machine configured to receive a computer-readable medium storing computer-readable instructions. The instructions are preferably executed by computer-executable components preferably integrated with a router. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A method for mesh router configuration, the method comprising:
    establishing, by a first router, an internet connection between a remote router management platform and the first router via a second router that is coupled to the first router, the second router being part of a local area network, wherein a router identifier of the first router is registered with a user account at the remote router management platform, the user account being associated with router configuration data for the local area network;
    sending, by the first router to the remote router management platform using the internet connection, a request for the router configuration data, the request comprising the router identifier; and
    receiving, by the first router, the router configuration data from the remote router management platform via the internet connection responsive to the remote router management platform verifying that the first router is registered to the user account, wherein at least a portion of the router configuration data, when executed by the first router, causes the first router to implement the local area network in tandem with the second router.

2. The method of claim 1, further comprising registering the router identifier to the user account at the remote router management platform prior to sending the request for the router configuration data.

3. The method of claim 2, wherein registering the router identifier comprises:
    receiving, by the first router, user input comprising router registration data; and
    sending, by the first router to the remote router management platform, the router registration data.

4. The method of claim 2, wherein registering the router identifier comprises:
    establishing, by the first router, a second internet connection between the remote router management platform and the first router; and
    sending, by the first router to the remote router management platform using the second internet connection, router registration data stored at the first router, the router registration data being associated with the router identifier.

5. The method of claim 2, wherein registering the router identifier comprises establishing, by the first router, a second internet connection between the remote router management platform and the first router, wherein establishing the second internet connection comprises:
    establishing, by the first router, a personal area network (PAN) wireless connection with a mobile device; and
    causing, by the first router, the mobile device to establish a cellular internet connection or a wireless local area network (WLAN) connection with the remote router management platform, wherein the second internet connection comprises the PAN wireless connection and one of the cellular internet connection or the WLAN connection, and wherein the WLAN connection is not part of the local area network.

6. The method of claim 1, wherein the first router is registered to the user account at the remote router management platform at a time of purchase of the first router.

7. The method of claim 1, further comprising:
    determining, by the first router from the router configuration data, that the local area network comprises more than one router registered to the user account; and
    automatically configuring the first router to operate as an access point or as a wireless repeater in the local area network responsive to determining that the local area network comprises more than one router registered to the user account, wherein the second router or a third router is previously configured to operate as an internet gateway.

8. The method of claim 1, further comprising:
    determining, by the first router from the router configuration data, that the local area network comprises more than one router registered to the user account and that the second router is configured to operate as an internet gateway for the local area network;
    determining, by the first router from the router configuration data, that the first router is designated as a master router; and
    automatically configuring the first router to operate as the internet gateway and the second router to operate as an access point or a wireless repeater in the local area network.

9. The method of claim 8, wherein automatically configuring the first router to operate as the internet gateway comprises automatically configuring the first router to operate as a Dynamic Host Configuration Protocol (DHCP) server of the local area network.

10. The method of claim 8, wherein automatically configuring the first router to operate as the internet gateway comprises automatically configuring the first router to operate as an authentication server of the local area network.

11. The method of claim 1, further comprising receiving, by the first router, second router configuration data from the remote router management platform after the first router is part of the local area network, the second router configuration data being different than the router configuration data, and wherein at least a portion of the second router configuration data, when executed by the first router, causes the first router to re-configure the local area network.

12. The method of claim 1, wherein the router configuration data comprises one or more configuration parameters comprising a router name, a router administrative password, a router wide area network (WAN) setting, an internet protocol (IP) address, a service set identifier (SSID) of a wireless local area network (WLAN), a WLAN password, a WLAN channel, a WLAN connection mode, a Dynamic Host Configuration Protocol (DHCP) server setting, a port forwarding setting, a network attached storage (NAS) setting, or a Digital Living Network Alliance (DLNA) server setting.

13. The method of claim 1, wherein establishing the internet connection comprises connecting to a hidden restricted wireless local area network implemented by the second router.

14. A method for mesh router configuration, the method comprising:
establishing, by a first router, an internet connection between a remote router management platform and the first router, the first router being part of a local area network, wherein a first router identifier of the first router is registered with a user account at the remote router management platform, the user account being associated with router configuration data for the local area network;
receiving, by the first router from a second router, a first request for the router configuration data, the first request comprising a second router identifier of the second router;
sending, by the first router, the first request to the remote router management platform using the internet connection;
receiving, by the first router, the router configuration data from the remote router management platform via the internet connection responsive to the remote router management platform verifying that the second router is registered to the user account; and
sending, by the first router, the router configuration data to the second router, wherein at least a portion of the router configuration data, when executed by the second router, causes the second router to implement the local area network in tandem with the first router.

15. The method of claim 14, wherein the first router and the second router are registered to the user account at the remote router management platform at a time of purchase of the first router and the second router.

16. The method of claim 14, further comprising:
receiving, by the first router from the second router, a second request to connect to a hidden restricted wireless local area network that is implemented by the first router, the second request being received before the first request, wherein the first router is operative to implement the hidden restricted wireless local area network without broadcasting a service set identifier corresponding to the hidden restricted wireless local area network; and
establishing, by the first router, a wireless connection between the first router and the second router, wherein receiving the first request comprises receiving the first request via the wireless connection, and wherein sending the router configuration data comprises sending the router configuration data via the wireless connection.

17. The method of claim 16, further comprising determining whether a manufacturer of the first router and the second router match, wherein establishing the wireless connection is responsive to the manufacturer of the first and second router matching.

18. The method of claim 16, further comprising:
receiving, by the first router from the second router, a first credential in connection with the second request; and
verifying, by the first router, whether the first credential matches a second credential stored at the first router, wherein establishing the wireless connection is responsive to the first credential and the second credential matching.

19. The method of claim 16, further comprising:
receiving, by the first router from the second router, a media access control (MAC) address of the second router in connection with the second request; and
verifying, by the first router, whether a prefix of the MAC address matches a predefined prefix stored at the first router, wherein establishing the wireless connection is responsive to the prefix and the predefined prefix matching.

20. A first router comprising:
a processor;
one or more wireless local area network (WLAN) interfaces operably coupled to the processor;
a personal area network (PAN) interface operatively coupled to the processor;
a wired network interface operably coupled to the processor; and
a memory operably coupled to the processor, the memory storing computer-readable instructions being operative, when executed by the processor, to cause the processor to:
establish an internet connection between a remote router management platform and the first router via a second router that is coupled to the first router, the second router being part of a local area network, wherein a router identifier of the first router is registered with a user account at the remote router management platform, the user account being associated with router configuration data for the local area network;
send, to the remote router management platform using the internet connection, a request for the router configuration data, the request comprising the router identifier; and
receive the router configuration data from the remote router management platform via the internet connection responsive to the remote router management platform verifying that the first router is registered to the user account, wherein at least a portion of the router configuration data, when executed by the first router, causes the first router to implement the local area network in tandem with the second router.

* * * * *